Sept. 9, 1924.

T. J. STURTEVANT 1,507,629

GRINDING MACHINE

Filed Feb. 26, 1924

INVENTOR:
Thomas J. Sturtevant
BY
Henry T. Williams,
ATTORNEY.

Patented Sept. 9, 1924.

1,507,629

UNITED STATES PATENT OFFICE.

THOMAS J. STURTEVANT, OF WELLESLEY, MASSACHUSETTS, ASSIGNOR TO STURTEVANT MILL COMPANY, OF BOSTON, MASSACHUSETTS, A CORPORATION OF MASSACHUSETTS.

GRINDING MACHINE.

Application filed February 26, 1924. Serial No. 695,226.

*To all whom it may concern:*

Be it known that I, THOMAS J. STURTEVANT, a citizen of the United States, residing at Wellesley, in the county of Norfolk and State of Massachusetts, have invented certain new and useful Improvements in Grinding Machines, of which the following is a specification.

The invention to be hereinafter described relates to machines for grinding or reducing coal and other materials.

This machine in its broad aspect comprises a rotary carrier having a ring runner or tire thereon, a rotary carrier having pushers thereon, and grinding balls or elements moved by the pushers in an orbit within the ring runner, and adapted to reduce material introduced to the inner surface of the runner. These carriers may rotate about a horizontal axis and at a differential speed, with the same direction of rotation or with opposite directions of rotation.

Heretofore, so far as I am aware, in mills of this general type, the ring within which the balls revolve has been fixed. As a consequence, a layer of material to be ground was not maintained on the inner surface of the ring throughout the circumference thereof. Therefore, the balls in travelling through their orbit, would intermittently engage material and the inner surface of the ring, and would have a pounding action on the ring resulting in objectionable wear on the pushers, balls and ring.

One of the purposes of the present invention is to provide a mill which overcomes this objection. The ring runner is rotated and at a sufficient speed to produce a centrifugal effect which will maintain a layer of material to be ground throughout the circumference of the inner surface of the runner. Therefore, in action the balls normally will engage material on the runner, and will not pound and grind against the runner. Thus, the life of the pushers, balls and runner is materially prolonged. The pushers are rotated at sufficient speed to cause the balls to press outward toward the runner under the influence of centrifugal force with the desired grinding action, but the balls do not need to be revolved with so great a relative speed with respect to the runner as heretofore has been necessary. As a consequence, there is a further reduction in the wear on the balls and the ring.

However, these mills are bound to receive hard usage, so that it is necessary from time to time to substitute new pushers and balls and a new ring runner or tire for old ones. Another purpose of the invention, therefore, is to provide a construction which will enable ready access to the pushers, balls and runner for the purpose of removing the worn ones from the machine and substituting new ones therefor. In carrying this feature of the invention into practical effect, in the present instance, the carriers for the runner and the balls are mounted on portions of shafts which overhang or project beyond the bearing support therefor, and the carriers are enclosed in a casing provided with a hinged door which may be readily swung to open position so as to expose and render conveniently accessible the parts within the casing.

With the aforesaid and other purposes in view, the character of the invention may be best understood from the following description of one good form of the invention shown in the accompanying drawings, wherein:

Fig. 1 is a vertical longitudinal section through the machine;

Fig. 2 on an enlarged scale is a vertical transverse section taken on line 2—2 of Fig. 1;

Figure 1:
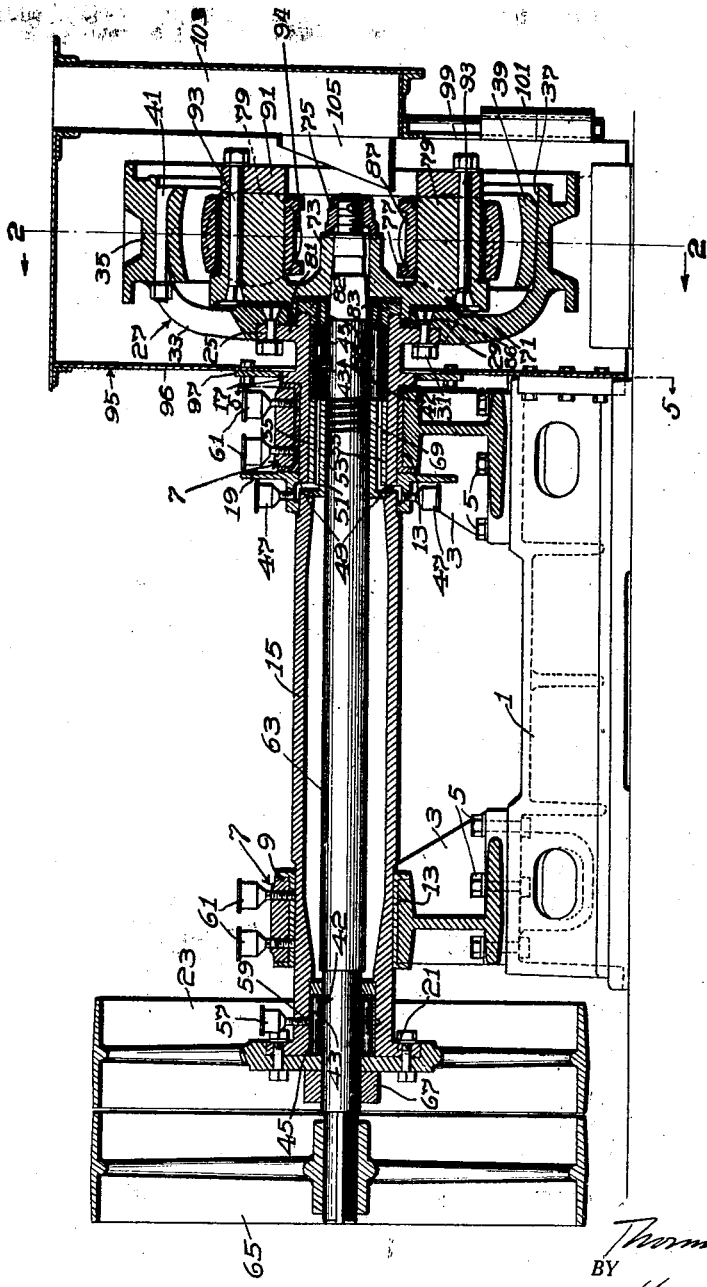

Referring to the drawings, the machine shown therein as one good form of the invention, may have any suitable support, in the present instance, comprising a pair of longitudinal bed members 1 supporting a pair of stands 3 bridging the bed members 1 at the ends thereof and secured thereto by bolts 5. Each of the stands is formed to provide half of a bearing 7, and a cap 9 provides the other half of the bearing; said cap being detachably secured to the stand by bolts 11. The bearings thus formed are provided with Babbitt metal linings 13.

Journalled in the bearings 7 is an outer sleeve shaft 15 which is prevented from movement in the direction of the axis thereof by a flange 17 formed on the shaft at one side of the right bearing 7, and a collar 19 fast on the shaft at the opposite side of said bearing. The left end of said shaft has an outstanding flange 21 to which is secured a pulley 23 adapted to be driven by a belt from any suitable source of power.

The right end portion of the shaft overhangs or projects outward beyond the right bearing 7, and has an outstanding flange 25 to which is secured a carrier or head 27. This carrier comprises a hub 29 recessed to receive the shaft flange 25 and secured thereto by bolts 31. Projecting outward from the hub are arms 33 carrying a rim 35 provided with a tapered inner surface 37. Fitted into this rim is a ring runner or tire 39 removably secured to the head by bolts 41. The construction is such that the bolts may be readily removed to permit the tire 39 to be detached from the head when it is desired to substitute a new one therefor.

Mounted in the hollow shaft 15 adjacent the opposite ends thereof are roller bearings 42 comprising raceways 43 and rollers 45 therein. To lubricate the roller bearing adjacent the right end of the shaft, the collar 19 referred to, is tapped to receive the necks of a pair of diametrically opposed grease cups 47 communicating with radial ports 49 in the shaft 15. These ports in turn communicate with a circumferential groove 51 in a sleeve 53 mounted in and secured to said shaft, said sleeve being provided with longitudinal ducts 55 which lead from the groove 51 to the roller bearing at the right end of the shaft.

To lubricate the roller bearing at the left end of the shaft, the latter may be tapped to receive the neck of a grease cup 57 leading to a circumferential groove 59 in said shaft surrounding the bearing. The bearings 7 for the shaft 15 may be lubricated by grease cups 61 mounted in the caps 9.

Journalled in the roller bearings 42 is an inner shaft 63 having an end portion projecting through and beyond the pulley 23 and having fast thereon a pulley 65 adapted to be driven by a belt from any suitable source of power. This inner shaft is prevented from axial movement toward the right by a collar 67 fast thereon engaging the hub of the pulley 23. To prevent the lubricant from working from the right roller bearing 45 toward the left along the shaft 63, the latter may be provided with a helical groove 69 which on rotation of the shaft will tend to feed the lubricant toward the right.

The right end portion of the inner shaft 63 projects beyond the outer shaft, and has fast thereon a head or carrier 71 having a hub 73 with a tapered bore on a tapered end of the shaft 63, and secured thereto by a nut 75. Projecting outward from the hub 73 is a disk 77 having studs 79 extending laterally therefrom of substantially trapezoidal section. The disk has a flange 81 projecting laterally therefrom overlapping a collar 82 fast in the end of the outer shaft. A washer 83 is interposed between the hub of the head and the collar 82. Axial movement of the inner shaft toward the left is prevented by engagement of the hub with the washer. Lubricant may reach the washer through ducts 85 in the collar 82 extending from the adjacent roller bearing to the washer. Suitable packing 86 may be provided between the flange 81 and the shaft flange 25. The construction is such that dust is prevented from reaching said roller bearing.

Mounted on the studs 79 referred to, are pushers 87 having apertures 89 formed to correspond with the shape of the studs. Each of said pushers has curved sides and outer portions relatively thick as compared to the portions nearer the shaft on which the pusher head is mounted. The curved sides of the pusher are grooved to limit lateral movements of the grinding elements to be described.

The pushers are removably held on the studs 79, in the present instance, by a ring 91 engaging the ends of the studs and secured thereto by through bolts 93 entered through the studs and ring. The construction is such that when it is desired to substitute new pushers for worn ones, it is merely necessary to release the nuts from the bolts 93 and withdraw the ring 91 from the bolts. Thereupon, the pushers may be readily slid off from the studs.

Between the pushers are grinding balls or elements 94. In the present instance they are free and are moved in an orbit by the pushers and at a speed sufficient to cause them to move outward under the influence of centrifugal force and exert the required grinding pressure.

The ring runner head, pusher head, pushers and balls are enclosed by a casing 95 having a wall 96 secured to the ends of the bed members 1 referred to. This wall is apertured to receive the end portions of the outer and inner shafts which project beyond the right bearing 7. A collar 97 secured to the wall 96 projects inward from the aperture to the shaft flange 17, referred to, on the outer shaft to prevent escape of dust from the casing along the shaft.

The casing is provided with a door 99 connected to the body of the casing by hinges 101, and secured in closed position by latches 102. This door carries a chute 103 provided with a mouth 105. The coal or other material to be ground may be conducted through the chute and mouth, and be delivered thereby to the inner surface of the ring runner 39. When it is desired to have access to the parts within the casing for the purpose of inspection or replacement of parts therein, the door may be readily swung on the vertical axes of its hinges to open position, thereby desirably exposing said parts.

The material reduced by the mill may flow off from the ring runner and discharge from the casing through an opening in the bottom thereof.

In operation, the ring runner head and the pusher head may be rotated in the same direction, but the pusher head is rotated at a higher speed than the runner head, so that the balls will be pushed in an orbit relatively to the runner, and will press outward under the influence of centrifugal force, and reduce material introduced to the runner. The runner is rotated at a speed to develop sufficient centrifugal force to maintain a layer of material throughout the circumference of the inner surface thereof. Under certain conditions the runner head and the pusher head may be rotated in opposite directions, and the pusher head may be rotated at a speed merely sufficient to cause the balls to move outward with the pressure required.

It will be noted that the runner head and the pusher head are on portions of the shafts projecting beyond the right stand 3, and the driving pulleys for said shafts are on end portions thereof projecting beyond the left stand 3. Thus, a balancing effect is provided which reduces the friction and wear on the bearings and contributes to the efficiency of operation of the mill. Any wear which would tend to cause looseness of the outer shaft in the bearings 7 will not affect the relation of the inner shaft with respect to the outer shaft, since the former is journalled in bearings in the latter.

When the grinding balls are moved outward under the influence of centrifugal force, they will be engaged by the thicker portions of the pushers which will stand considerable wear. When the thicker portion at one side of a pusher becomes worn, it may be reversed on its stud end-for-end, so that the opposite side of the pusher will be in active frictional engagement with the ball. When both sides of a pusher have been worn down, it may be readily removed and a new one substituted therefor as described.

Figures 2, 3:
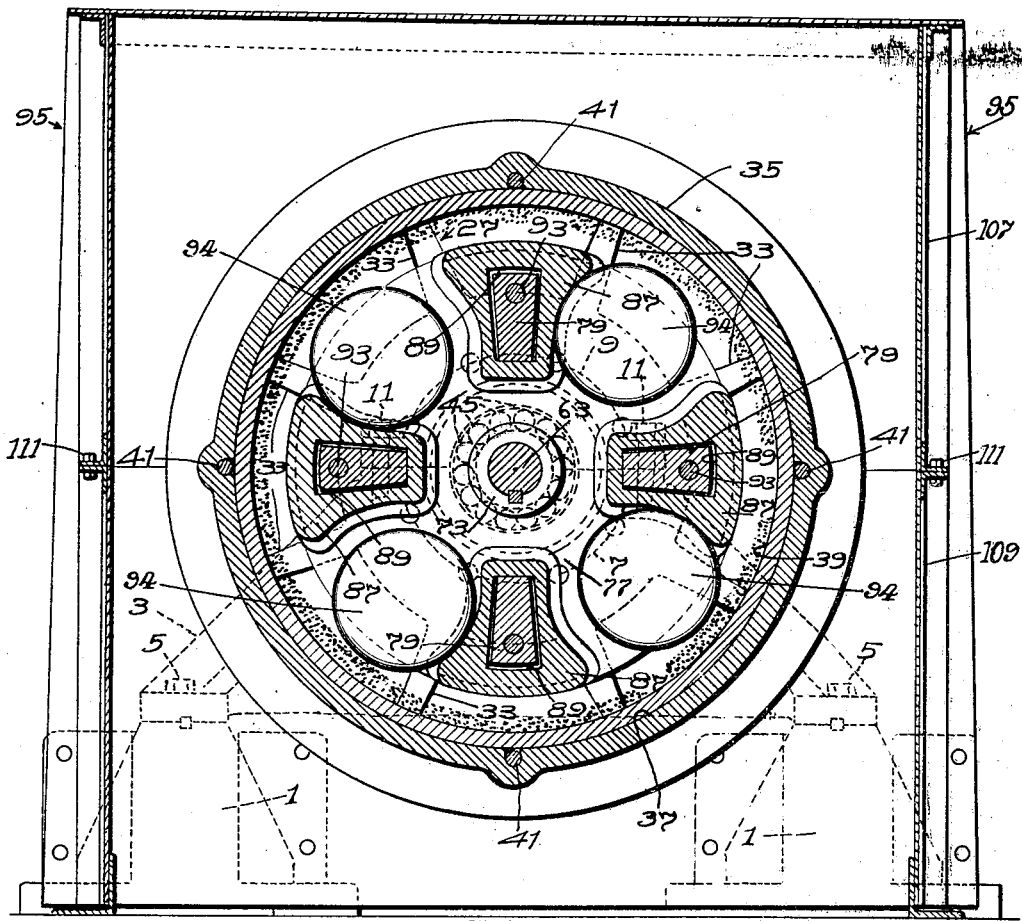
Fig. 3 is a plan of the casing containing the ring runner, pushers and balls.
Figure 4:
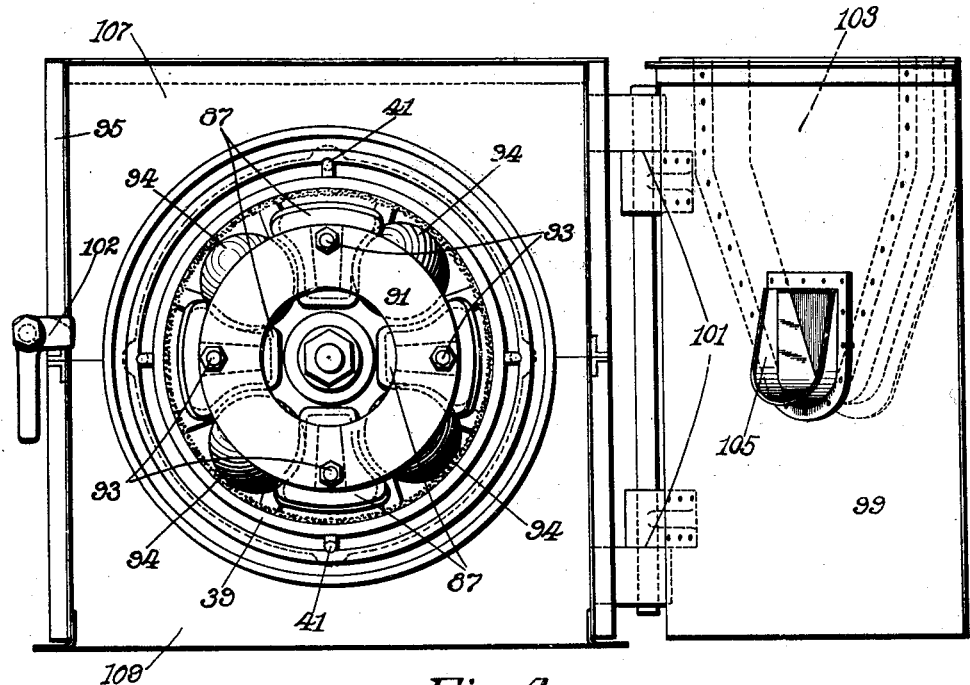
Fig. 4 is an end elevation of the machine with the door of the casing open and disclosing parts within the casing.
Figure 5:
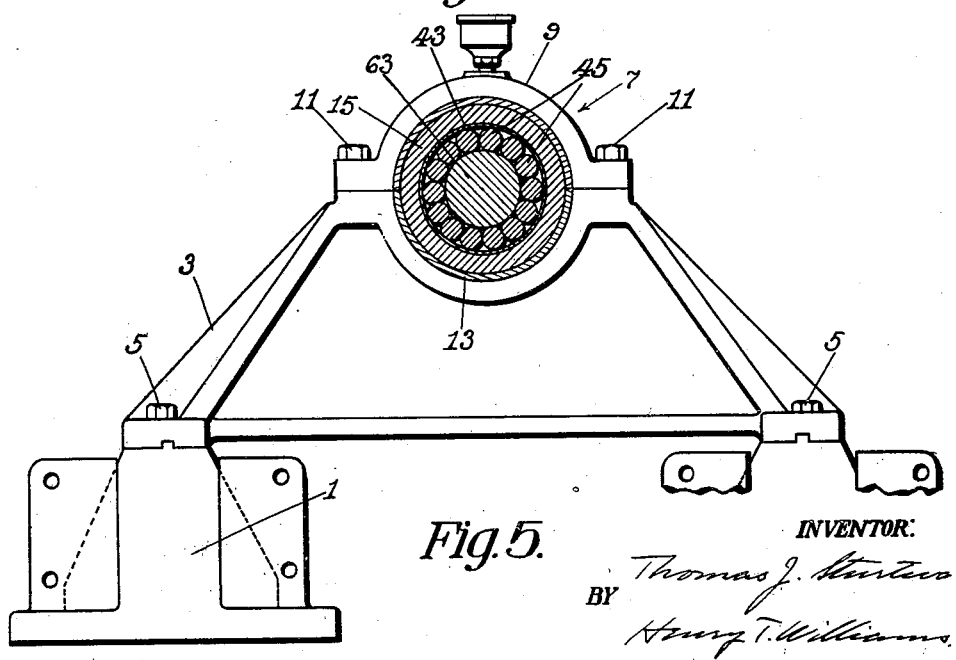
Fig. 5 on an enlarged scale is a vertical transverse section taken on line 5—5 of Fig. 1.

The casing is formed of upper and lower parts 107 and 109 detachably secured together by bolts 111 (Fig. 2), and as stated the bearings 7 have detachable caps 9. The construction is such that in assembling the machine, the shaft may be readily lowered into the bearings and then the caps and the upper part of the casing may be set in place. The caps and the upper part of the casing may be readily removed thereby to permit lifting of the shaft from its bearings if desired.

It will be noted that the mouth of the chute is disposed to deliver material adjacent the end of the shaft. The consequence is that material may come between the balls and the pushers, thereby reducing wear thereon and contributing to reducing of the material.

By my invention is provided a grinding mill which is simple and strong in construction. The parts in the casing are readily accessible for the purpose of inspection, adjustment and replacement thereof, and the construction is such that the wear on the pushers, balls and ring is materially less than in mills of this type heretofore used.

It will be understood that the invention is not limited to the specific embodiment shown, and that various deviations may be made therefrom without departing from the spirit and scope of the appended claims.

What is claimed is:

1. A grinding machine comprising, in combination, a support having bearings, an outer sleeve shaft journalled in said bearings and having a free end portion projecting beyond one of said bearings, a head fast on the end portion of said shaft, a ring runner carried by said head, an inner shaft in said sleeve shaft and projecting beyond the end portion thereof, a pusher head fast on the inner shaft, pushers carried by the pusher head, and free grinding balls adapted to be pushed along the runner by the pushers throughout an orbit and urged toward the runner by centrifugal force, and means to guide material to the runner that it may be ground between the balls and the runner.

2. A grinding machine comprising, in combination, a head having a ring runner thereon, a head having studs projecting laterally therefrom, pushers removably mounted on said studs, free grinding elements adapted to be moved in an orbit by the pushers and thrown toward the runner by centrifugal force on rotation of the pusher head, and a casing for the aforesaid parts having a door larger than the runner adapted to be opened to expose and render readily accessible the pushers to permit removal thereof from the studs, and permit removal of the ring runner from the head.

3. A grinding machine comprising, in combination, a support having bearings, an outer sleeve shaft journalled in said bearings, an inner shaft in the outer shaft, a head on the outer shaft having a ring runner thereon, a head on the inner shaft having studs projecting therefrom, pushers on the studs, a ring detachably secured to the ends of the studs for holding the pushers thereon, and grinding elements between the pushers and adapted to be revolved thereby in an orbit within the runner to grind material introduced between them.

4. A grinding machine comprising, in combination, a support having bearings, an outer sleeve shaft journalled in said bearings and having free end portions projecting beyond said bearings, an inner shaft journalled in the outer shaft and having free end portions projecting beyond the end portions of the outer shaft, a head on one end portion of the outer shaft and having a ring runner thereon, a head on one end portion of the inner shaft within the runner head, pushers carried by the inner head, grinding elements between the pushers and adapted to be moved thereby in an orbit within the ring runner to grind material introduced between them, and driving pulleys on the end portions of said shafts opposite to the end portions carrying said heads.

5. A grinding machine comprising, in combination, a support having bearings, an outer sleeve shaft journalled in said bearings and having a free end portion projecting beyond one of said bearings, a head on said end portion having a ring runner thereon, an inner shaft journalled in bearings in the outer shaft and having a free end portion projecting beyond said end portion of the outer shaft, a head on said end portion of the inner shaft, pushers on the inner shaft head, grinding balls between the pushers and adapted to be moved thereby in an orbit within the runner, means to introduce materials to be ground between the runner and balls, and means to prevent dust from working along the end portions of said shafts to the bearings adjacent thereto.

6. A grinding machine comprising, in combination, a support having bearings, an outer shaft jouralled in said bearings and having end portions projecting beyond said bearings, an inner shaft journalled in bearings in the outer shaft and having end portions projecting beyond the end portions of the outer shaft, a head on one end portion of the outer shaft, a pulley on the opposite end portion of said shaft, a ring runner carried by said head, a head on one end portion of the inner shaft within the ring runner and having pushers thereon, a pulley on the opposite end portion of the inner shaft, grinding balls between the pushers and adapted to be revolved thereby in an orbit within the ring runner, and a casing enclosing said heads having a door larger than the runner and carrying a chute for conducting material to be ground to the runner, said door when open exposing the runner, pushers and balls to permit ready introduction of the same into operable position and removal therefrom.

7. A grinding machine comprising, in combination, a support having bearings, a horizontal outer shaft journalled in said bearings and having an end portion projecting beyond one of said bearings, a head on said shaft having a ring runner thereon in a plane transverse to the axis of said shaft, an inner shaft in said outer shaft and having an end portion projecting beyond the end portion of the outer shaft, a head mounted on the end portion of the inner shaft, pushers carried by said head, and grinding balls between the pushers and adapted to be moved thereby in an orbit within the ring runner to grind material introduced to the runner.

8. A grinding machine comprising, in combination, a ring runner, a carrier therefor rotatable on a horizontal axis, pushers, a carrier therefor rotatable about said axis, and free grinding elements between the pushers and adapted to be moved in an orbit thereby and adapted to be thrown toward the inner surface of the ring runner by centrifugal force, each of said pushers being removable from the carrier for the pushers in a direction transverse to the plane of the ring runner and independently of and without displacing the other pushers.

9. A grinding machine commprising, in combination, a rotary carrier, a ring runner thereon, a second rotary carrier, pushers thereon, free grinding elements adapted to be moved in an orbit by the pushers and adapted to be thrown toward the runner by centrifugal force, each of said pushers being removable from the carrier for the pushers independently of the other pushers, and each of the pushers having a pair of opposed faces, each singly for active pushing engagement with an element, the pusher being reversible to present one of said faces for active pushing engagement with the element when its other face has become worn.

10. A grinding machine comprising, in combination, a rotary carrier, a ring runner mounted thereon, a second rotary carrier, pushers removably mounted thereon, free grinding elements adapted to be moved in an orbit by the pushers and adapted to be thrown toward the runner by centrifugal force, and a casing for said parts having a door sufficiently large to permit removal of the ring, pushers and elements from the casing, said door having a chute thereon provided with a mouth for delivering materials centrally of the orbit of the grinding elements.

11. A grinding machine comprising, in combination, a rotary carrier, a ring runner mounted thereon, a rotary carrier having studs projecting therefrom in directions substantially parallel to the axes of said carriers, pushers mounted on said studs, and free grinding elements between the pushers adapted to be moved in an orbit by the pushers and be thrown toward the runner by centrifugal force on rotation of the pusher carrier, said pushers being independently removable from their studs.

12. A grinding machine comprising, in combination, a support having a pair of bearings spaced a substantial distance apart, a sleeve shaft journalled in said bearings and having a free end portion projecting beyond one of said bearings, a carrier on said sleeve shaft, a ring runner secured to the carrier, an inner shaft mounted in the sleeve shaft and having a free end portion projecting beyond the free end portion of the sleeve shaft, a carrier on the inner shaft having studs, pushers on the studs, means for holding the pushers on the studs and having provision permitting removal of the pushers from the studs, grinding balls between the pushers and adapted to be moved in an orbit by the pushers and be thrown toward the inner surface of the runner by centrifugal force on rotation of the pusher carrier, and means for delivering materials to the runner ring that they may be ground between the balls and ring.

13. A grinding machine comprising, in combination, a support having bearings, an outer sleeve shaft journalled in said bearings, and having free end portions projecting beyond said bearings, an inner shaft journalled in the outer shaft and having free end portions projecting beyond the end portions of the outer shaft, a carrier on one end portion of the outer shaft and having a ring runner thereon, a carrier on one end portion of the inner shaft within the ring runner, pushers carried by the latter carrier, grinding elements adapted to be moved by the pushers in an orbit within the ring runner to grind the material introduced between them, and driving means on the end portions of said shafts opposed to the end portions on which the carriers are mounted.

14. A grinding machine comprising, in combination, a support having bearings, a horizontal sleeve shaft journalled in said bearings, a carrier on said shaft, a ring runner mounted on the carrier, an inner shaft in the sleeve shaft, a carrier on the inner shaft having supporting members projecting laterally therefrom, pushers on said members and adapted to be slid laterally off from said members, and grinding elements adapted to be moved in an orbit by the pushers and to be thrown toward the inner surface of the ring runner by centrifugal force.

THOMAS J. STURTEVANT.